April 9, 1963 R. N. DAY 3,084,970
VEHICLE CARRYING TRACTOR-TRAILER
Filed Aug. 15, 1961 7 Sheets-Sheet 1
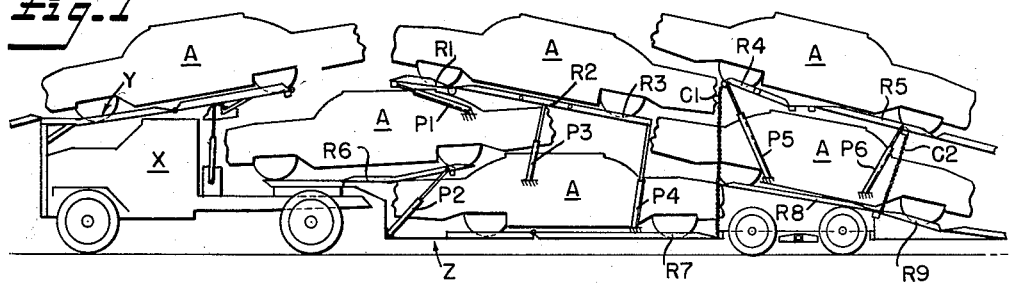
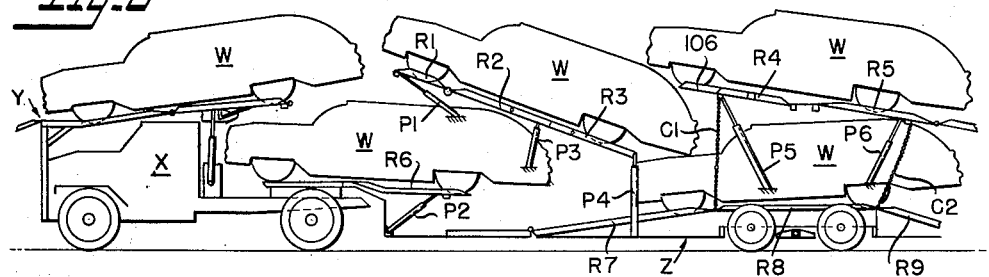
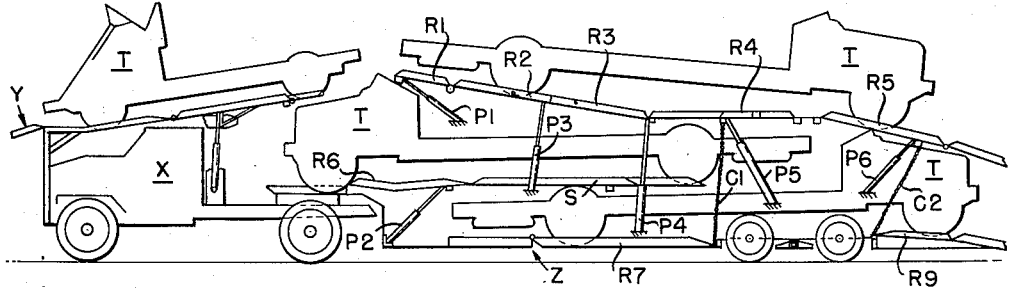
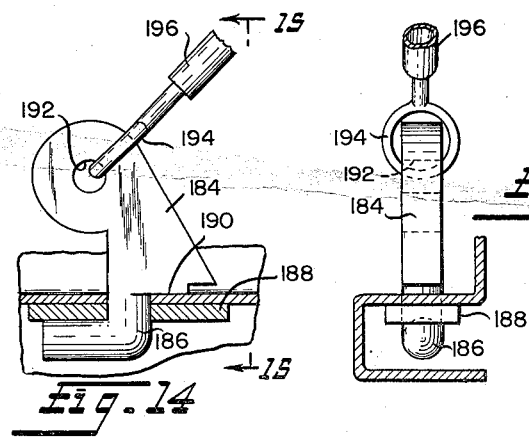
INVENTOR
Raymond N. Day
Shlesinger & Shlesinger
ATTORNEYS

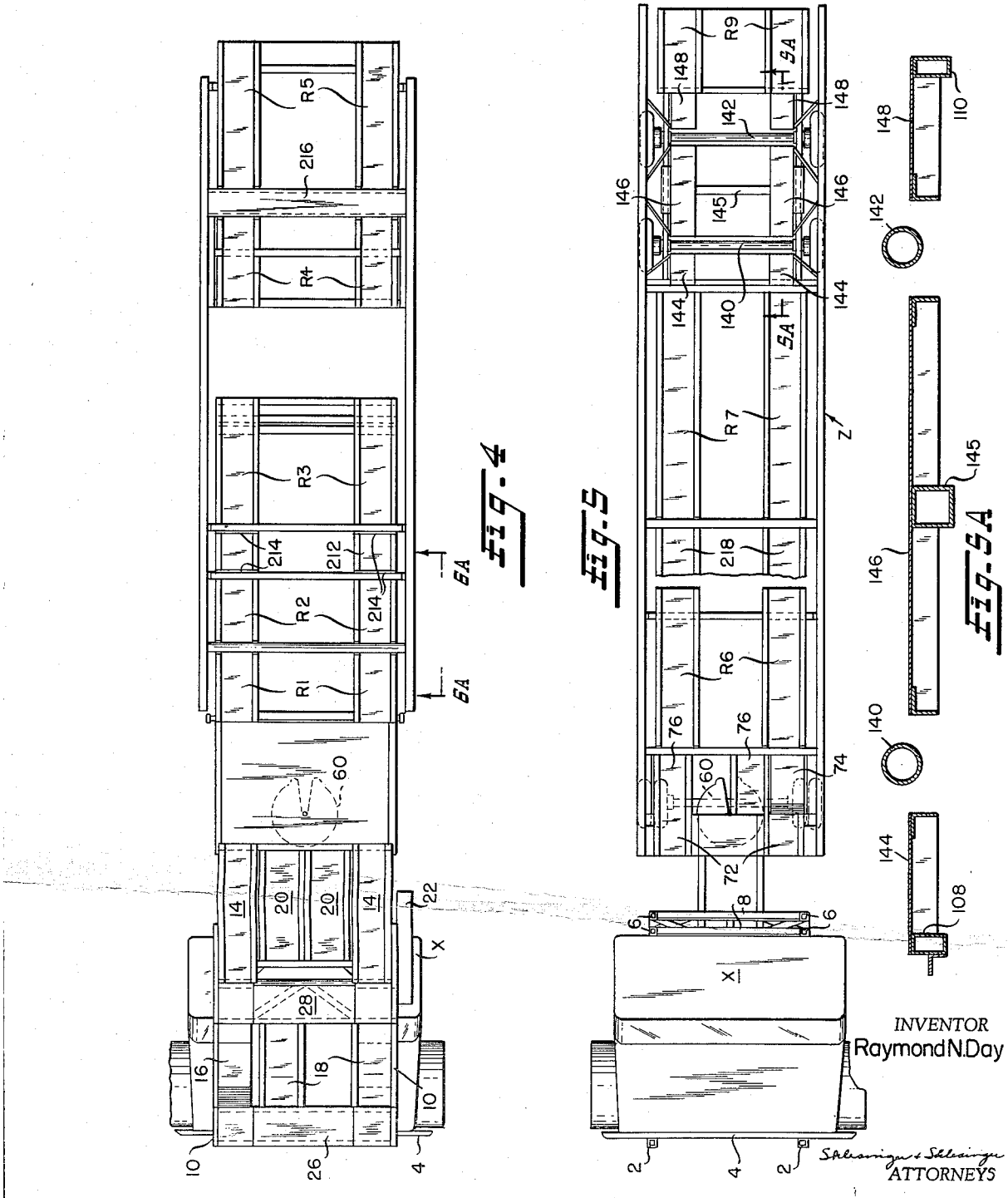

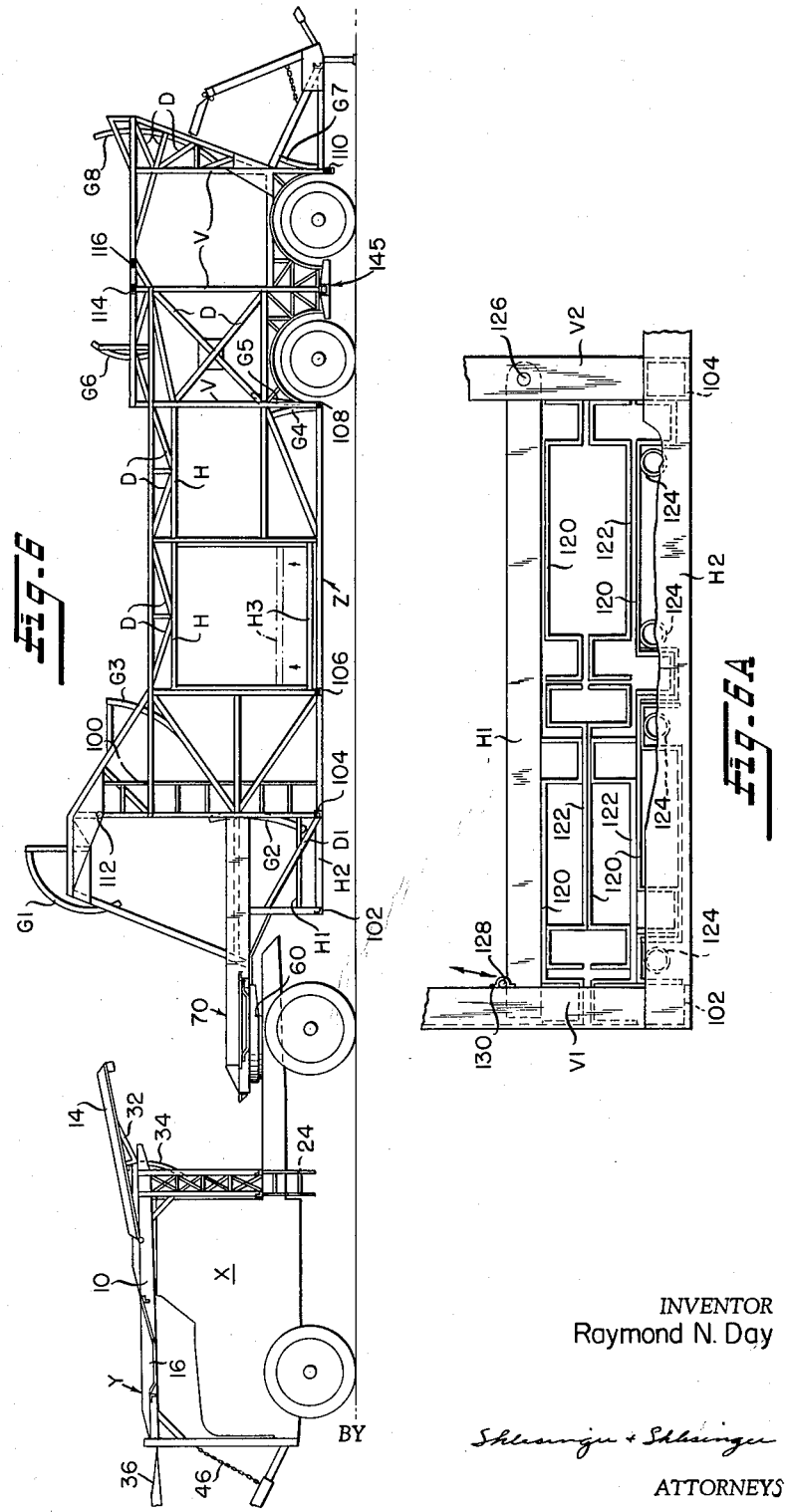

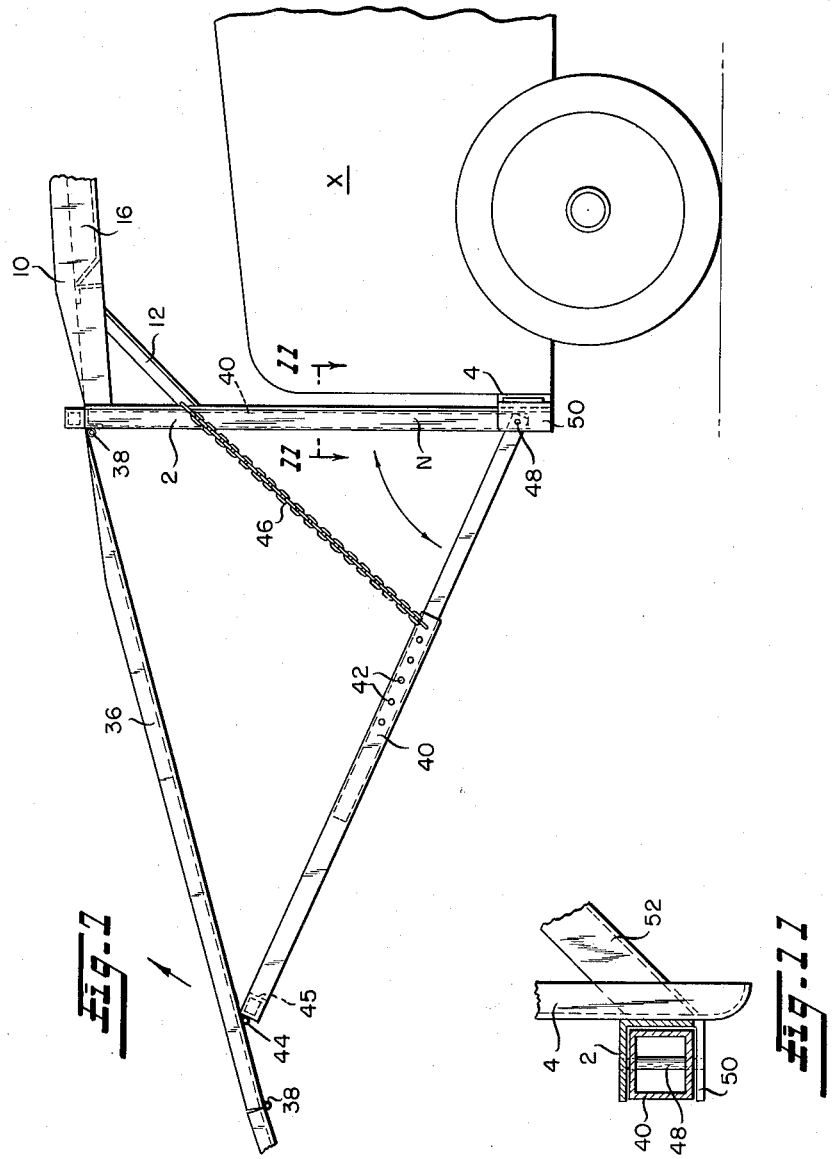

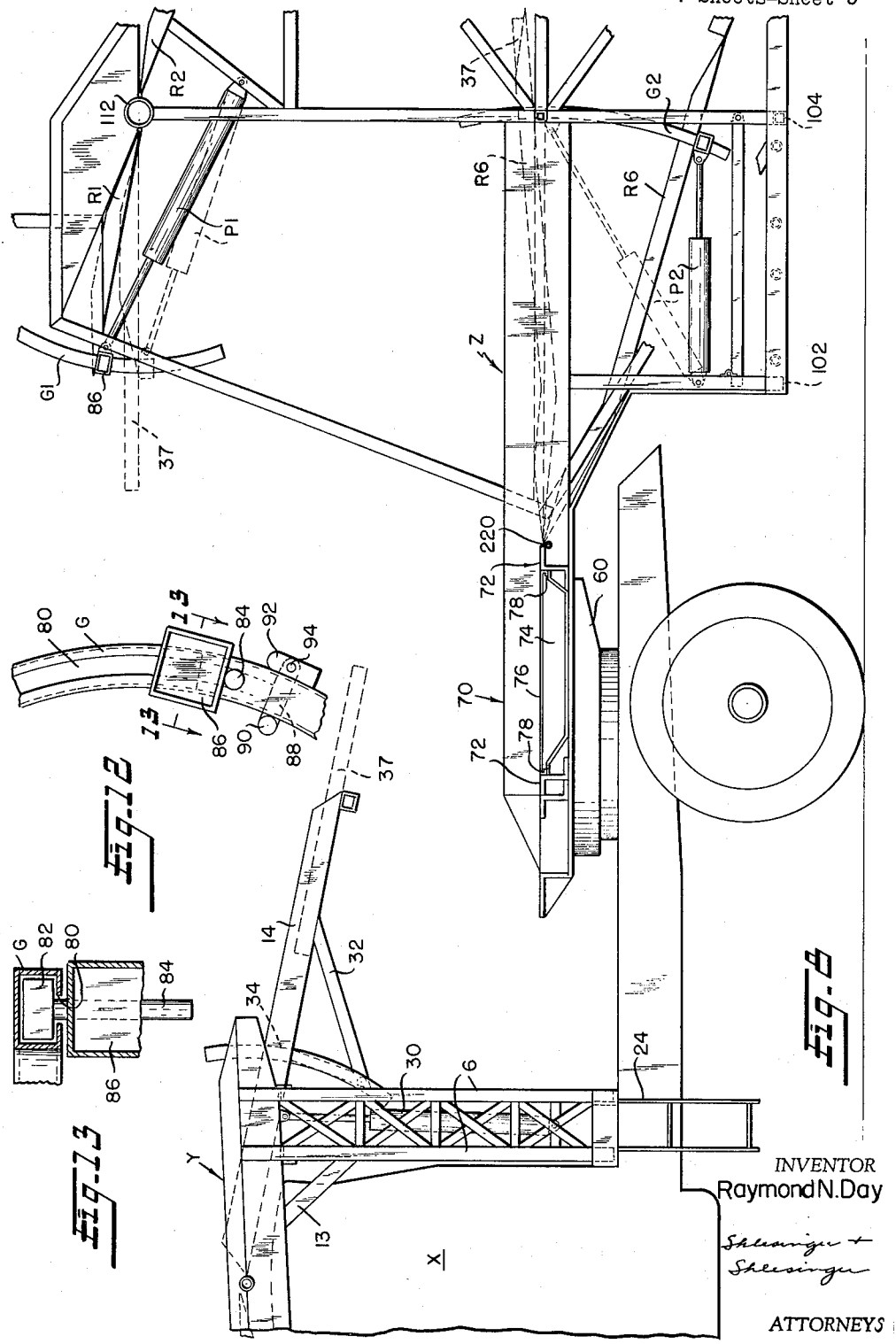

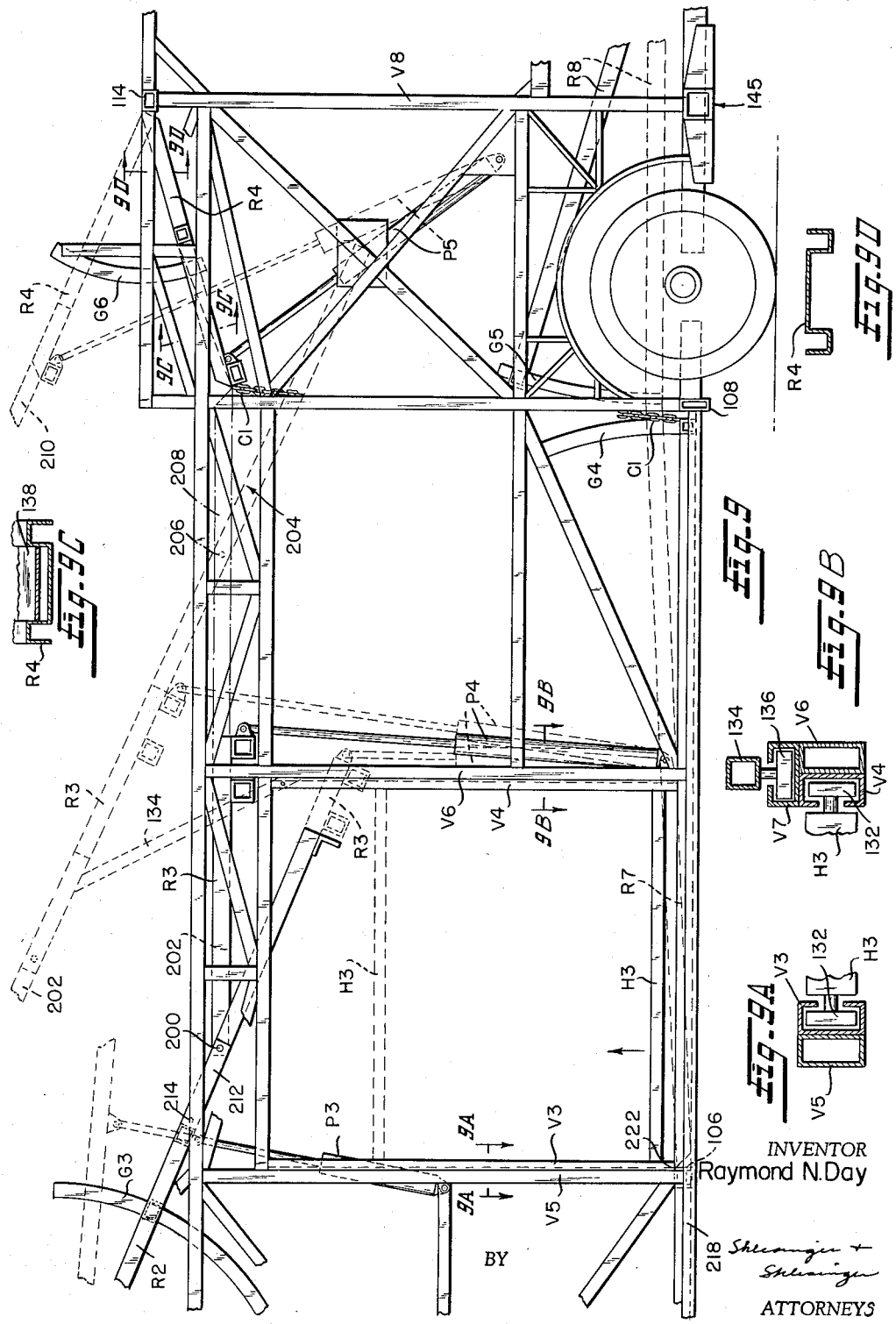

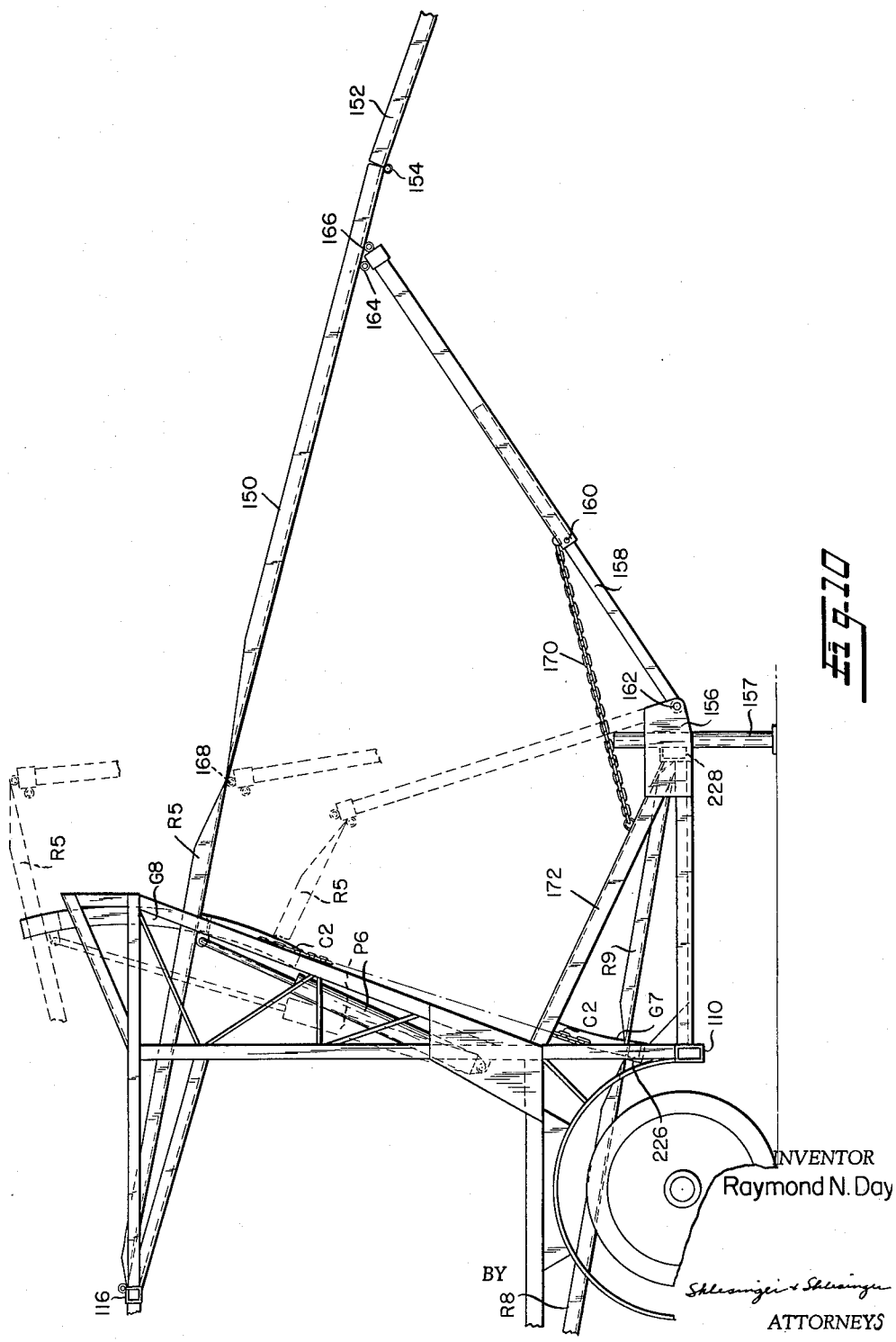

ent Office 3,084,970
Patented Apr. 9, 1963

3,084,970
VEHICLE CARRYING TRACTOR-TRAILER
Raymond N. Day, 800 Shelley Road, Baltimore 4, Md.
Filed Aug. 15, 1961, Ser. No. 131,598
13 Claims. (Cl. 296—1)

This invention relates to improvements in vehicle carrying tractor-trailers and specifically involves improvements in the headramp and in the trailer.

For many years, automobile carriers have been designed primarily for hauling a specific type vehicle. Such design has limited the utility of the carrier particularly when a variety of payloads is contemplated. Loading vehicles other than the general type for which the trailer was designed becomes extremely difficult as well as time consuming. When such carriers are used to carry other vehicles, loading, unloading and storage problems develop requiring special apparatus and equipment.

In the past, there was very little need for a universal type carrier since most vehicles were basically of standard height and length. Today, in the automobile class alone, there are small foreign cars, compacts, intermediate class cars, deluxe class cars, and station wagons to name a few of the automobile types. In addition, there are bus-type vehicles for family use, light pick-up trucks, heavy trucks, and buses of the school variety, etc. Where these types of vehicle have been transported by the standard carrier now in use, the margin of profit has been extremely small as compared with railroad shipping. In many instances, transporting certain type vehicles to their place of destination by automobile carriers, has been done at a loss to the shipper.

The present trend to eliminate local assembly plants for automobiles and to substitute central depots from which cars will be shipped fairly great distances presents additional problems since the depots will not be able to be as selective in shipping as were the assembly plants. An order will come in from a great distance for a variety of different type automobiles. Since the shipper will not be able to load the various types on one "rig," he will have to have at least two "rigs" for carrying different types of equipment. In many instances, he will not be able to profitably ship certain vehicles since a request will frequently be insufficient to provide a full load of one type, or another type of vehicle. The necessity of having different types of "rigs" for carrying different types of loads, will be costly requiring additional maintenance, etc. It will also be obvious, that hauling one type of vehicle in one direction may mean that the carrier will have to "dead head" on the return trip because of inability to carry a different type of vehicle. The present invention is designed to eliminate the problems aforementioned.

It is an object of this invention to provide a tractor-trailer combination which is universally applicable to a wide variety of sizes and types of vehicles and trucks.

Another object of this invention is to provide a tractor-trailer combination which is readily loaded and unloaded.

A further object of this invention is to provide a tractor-trailer having a truss design which cuts down the dead load of the trailer and gives a much stronger structure for carrying heavier loads. The construction of the trailer is such that the dead load is reduced resulting in a greater payload. Additionally, the members of the trailer and the headramp are designed to sustain the maximum live loads plus impact loads.

Yet another object of this invention is to provide a tractor-trailer combination which may be loaded from the front of the headramp as well as from the rear of the trailer or the front of the trailer as desired.

Still another object of this invention is to provide means for storing loading skids within the "rig" itself.

Another object of this invention is to provide a "rig" which will require less capital investment for equipment because of the reduction of the number of pieces of equipment in operation.

A further object of this invention is to provide a "rig" having adjustable runways to permit the transportation of various size wheel base vehicles.

Still a further object of this invention is to provide a vehicle carrier which has better load distribution thereby reducing the wear and tear by such vehicles on highways.

Another object of this invention is to provide a tractor-trailer combination which can utilize hundreds of different loading combinations for vehicles presently in existence as well as vehicles contemplated within the foreseeable future.

Still a further object of this invention is to provide a trailer and a headramp which will haul trucks, large automobiles, and compact automobiles. It is also contemplated, that this invention will be readily adaptable to hauling other vehicular equipment such as tractors, farm machinery, and the like.

Yet another object of this invention is to provide a tractor-trailer combination which has adjustable runways which are power operated for ready adaptation to various types of vehicles.

Still another object of this invention is to provide a tractor-trailer combination which has means for securing the vehicles to the "rig" which means are readily adaptable for various types of vehicles.

Another object of this invention is to increase the payload over present existing carriers.

These and other objects and advantages of this invention will be apparent from the following description and claims.

In the accompanying drawings which illustrate by way of example various embodiments of this invention:

FIGS. 1, 2 and 3 are schematic views showing a few of the hundreds of different loading arrangements of vehicles as taught by this invention;

FIG. 4 is a top plan view of the tractor-trailer combination showing the overhead loading ramps and runways;

FIG. 5 is a top plan view of the tractor-trailer combination showing the base platform ramp of the trailer and fragmentary portions of the headramp;

FIG. 5A is a transverse section taken along the lines 5A—5A in FIG. 5 when viewed in the direction of the arrows. The section is enlarged and fragmentary;

FIG. 6 is a side elevation view showing the headramp and the trailer; the headramp and the trailer showing in part the loading apparatus; and the trailer showing the truss arrangement;

FIG. 6A is a fragmentary side elevation view enlarged and taken along the lines 6A—6A when looking in the direction of the arrows as viewed in FIG. 4;

FIG. 7 is a fragmentary side elevation view showing in part the front loading platforms of the headramp;

FIGS. 8, 9 and 10 are fragmentary side elevational views showing portions of the "rig" in series extending from the rear portion of the tractor cab to the rear portion of the trailer including portions of the trailer loading ramp;

FIGS. 9A, 9B, 9C and 9D are enlarged fragmentary sectional views taken along the lines 9A—9A, 9B—9B, 9C—9C and 9D—9D respectively and looking in the direction of the arrows as shown in FIG. 9;

FIG. 11 is a cross sectional enlarged view taken along the line 11—11 in FIG. 7 and viewed in the direction of the arrows;

FIG. 12 is an enlarged fragmentary section of a track member illustrative of the type used in this invention;

FIG. 13 is a fragmentary section of a view taken along the lines 13—13 in FIG. 12 and viewed in the direction of the arrows;

FIG. 14 is an enlarged fragmentary section showing the hold-down clamp;

FIG. 15 is a sectional view taken along the line 15—15 of FIG. 14 and viewed in the direction of the arrows;

FIG. 16 is a fragmentary illustration of a piece of runway with a hold-down lug in position in one of the holes of the runway as contemplated by this invention.

In the drawings, X indicates the tractor, Y indicates the headramp, and Z indicates the trailer. A refers to large automobiles, W to large station wagons, and T to trucks.

Headramp

Headramp Y as best shown in FIGURES 4, 5, 6, 7 and 8, is removably secured to the tractor X by front vertical support angle members or tubes 2 which are secured to the tractor bumper 4, and rear vertical support members 6, which are supported by the tractor frame through cross beams 8. The headramp Y has stationary runways 10 supported by members 2 and 6. Angle braces 12 and 13 additionally serve to strengthen headramp Y. Stationary runways 10 support pivoted runways 14. Runways 10 are provided with wheel pockets 16. Slidable runway sections 18 best shown in FIGURE 4 normally cover pockets 16 during loading operations or when automobiles are being hauled. Pockets 16 are used to lower the overhead clearance of loads and particularly loads of trucks T. Between pivoted runways 14, cross members are provided to permit the storage of jump skids 20.

A catwalk 22 is provided on the left hand side of the headramp Y. A ladder 24 is provided on the left hand side of the headramp Y. Cross members 26 and 28 connecting runways 10 also serve as guide rails for sliding runways 18. Rear supporting members 6 and 8 are adapted to support at least one hydraulic-type lift member 30 for raising and lowering pivoted runways 14. Angle members 32 on either side of the runways 14 are provided with track engaging members hereinafter described which slide in guide tracks 34 which are stationary and secured to the rear portion of the headramp Y by welding, bolts or the like not shown. Runways 14 are provided with a sliding extension 37 to permit the support of vehicles having varying wheel bases.

A removable loading ramp having runways 36 as best shown in FIGURE 7 is secured to the front edge of the runways 10 by a removable pin 38. Runways 36 may be in sections which are connected by pins 38. Runways 36 are supported by telescoping struts 40 which are adjustable in length as noted by the removable pin holes 42. Runways R1 and R6 also have sliding runway extensions 37. The struts 40 are connected to runways 36 by removable pins 44. Additional support for the runways 36 and struts 40 is furnished through chain support members 46 which are secured from struts 40 to vertical members 2.

Struts 40 are pivoted about pivot pins 48 passing through an extension 50 in bumper 4 and upright angle members 2. FIGURE 11 shows bumper member 4 with part of the support brace 52, extending rearwardly therefrom to tractor chassis. The struts 40 are stored during transport in the angles 2 upon removal of pins 38 and 44. Cross members 45 connects runways 36. Runways 36, having been disconnected, are stored in the carrier means provided and hereafter described. Telescoping struts 40 may be held in place in the stored position by a clamp or a pin or the like not shown.

Trailer

The trailer Z is connected to the tractor through a fifth wheel generally indicated as 60. The trailer Z has nine pivoted runways R1 through R9. Runways R1 through R5 are located on the overhead platform of the trailer Z. Runways R6 through R9 are located on the base platform of the trailer Z.

The runways R1 through R9 are movable about their pivots by means of pistons P1 through P6. The pistons are numbered from front to rear in sequence as viewed.

Guide rails G1 through G8 are provided to stabilize and true the movement of the runways R1 through R9 in their various pivoted positions of adjustment. The guide rails G1 through G8 are consecutively numbered when viewed from front to rear. In the drawings the power means is illustrated by pistons P1 through P6. Other types of power means may be employed in place of the fluid operated pistons. It is obvious that electric motors and the like may be used.

Pivoted runways R7, R8 and R9 are raised and lowered by means of lifting chains C1 and C2. The chains are adaptable for engagement with the ends of runways R7, R8 and R9 and with overhead runways R5 and R4. Movement of pistons P5 and P6 operates to lift runways R7, R8, and R9 depending upon the chain connections C1 and C2 with these respective runways.

FIGURE 6 shows the truss arrangement of trailer Z. For the purpose of this disclosure, all diagonal braces are designated as D, all horizontal braces as H, and all vertical braces as V. Illustrations of the lettering of these members is made in FIGURE 6.

The trailer Z is provided with a forward fifth wheel connecting section 70. This connecting section includes stationary runways 72 connecting with pivoted runways R6. The stationary runways 72 have wheel pockets 74 best shown in FIGURE 8 and FIGURE 5. Cover members 76 normally cover pockets 74. These cover members are slidable laterally away from pockets 74 whenever it is required that the load be shifted downwardly to permit clearance. The wheels of the vehicle will then rest within the pockets. FIGURE 5 shows the pocket cover members 76 in their operative and inoperative positions. It is to be noted that guide rails 78 are provided for the cover members 76. The arrangement of members 72 through 76 is similar to the arrangement for the wheel pockets in the headramp Y.

Tractor-Trailer Guide Rails

FIGURES 12 and 13 show in detail a typical arrangement of the guide rails G1 through G8. Guide rails G shown in FIGURES 12 and 13 are provided with a slot 80 for receiving a wheel bearing or shoe plate 82 or the like. The wheel bearing 82 is connected to a rod 84 which supports a cross beam 86 which is connected to its respective pivoted runway. FIGURE 13 shows a locking pin 88 passing through the guide rail G. A knob 90 is at one end of the pin to prevent it from slipping through a hole in the rail G not shown. The other end of the pin 88 is provided with a rotatable locking finger 92 rotatable on pin 94. The pins 88 are inserted into the rails at various positions providing for permanent maintenance of the runways in an elevated position without the necessity of having to maintain fluid pressure in the pistons P1 through P6 at all times.

The fifth wheel connection 70 on trailer Z is adaptable to receive jump skids for removing the vehicles directly from the forward end of the trailer. Means for securing the jump skids to the forward end of the trailer Z are not shown but will be obvious to those skilled in the art. When the tractor Z is jackknifed about its fifth wheel, loading can then be done from the forward end of the trailer.

A ladder 100 is provided on both sides for ready access to the overhead ramp of the trailer Z.

The trailer Z as best shown in FIGURE 6 is provided with a series of cross members 102, 104, 106, 108, 110, 112, 114, 116 and 145. Cross members 102 through 110 are shown in FIGURE 6 in the base platform viewed from front to rear and members 112 through 116 are shown in the overhead platform reading from front to rear. Cross member or support 112 is stationary. These members may be angle irons, rectangular structural tubes, or pipes as the case may be. The combination of diagonal, horizontal, vertical and cross members, results in the formation of a truss arrangement which is cantilevered both fore and aft of the trailer as well as across the trailer providing the maximum load bearing arrangement with the minimum of weight. The drawings show other connecting members which serve to strengthen the load but are not necessarily the main support truss members.

Trailer-Skid Storage

The carrier is provided with means for storing jump skids and loading skids as best illustrated in FIGURE 6A. Diagonal D1 has been removed from the drawing in order to better show the arrangement of jump skids. The jump skids 120 and 122 are nested. Skids 120 are inverted to receive skids 122 which are illustrated in their normal position. The storing means of carrier for the jump skids is formed by horizontals H1 and H2 and by verticals V1 and V2. The jump skids are supported on cross pipe members 124. Horizontal H1 may be pivoted at one end about a pivot 126 and locked at the other end by locking pin 128 received in a pin bracket 130. It is generally contemplated that the skids be no longer than the width of the trailer Z. The skids may be interchangeable.

Trailer-Central Skid Support Structure

Centrally of the trailer Z and on either side thereof, a horizontal bar H3 best shown in FIGURE 9 is slidably mounted in a pair of vertical guide posts V3 and V4 which are backed to vertical posts V5 and V6 respectively. FIGURES 9A and 9B illustrate a manner in which horizontal brace H3 is mounted and guided in tracks V3 and V4. Horizontal brace H3 is adapted to receive guide rollers 132. It is obvious that any other type of guide means may be provided. Transverse bars (not shown) support jump skids S (FIGURE 3) at an elevated adjusted position to permit additional loading arrangements such as trucks T.

FIGURE 9B also shows the use of a bracing strut 134 which is used to support one of runways R3 as indicated in FIGURE 9. Bracing strut 134 is mounted to slide in vertical post V7 by means of a guide roller 136. Support 134 is maintained in an elevated position in vertical posts V7 by means of pins or the like not shown. Holes for receiving the support 134 are provided in the runways R3.

It is contemplated, that pistons P and guide rails G and chain lifts C will be mounted in pairs on either side of the trailer. The pairs will be operated in unison in order to raise the runways R which are in pairs simultaneously. It is obvious that other means for lifting may be provided and mounted on one side only.

The hydraulic pistons P1 through P6 are pivotally supported on either side of the trailer by brackets as indicated generally in the drawings. The position of the brackets may be varied to some extent depending upon the type of piston used.

FIGURES 9C and 9D illustrate the manner in which the flat portion of the runway R4 is tapered toward the forward end as indicated in FIGURE 9C by means of a plate 138.

It is contemplated that the usual drip pans beneath the runways will be provided. FIGURE 5A illustrates the rear axle arrangement which permits the loads to be carried closer to the ground thereby permitting better head room clearance. The axles 140 and 142 are separated by trailer plate members 144, 146 and 148. A cross member 145 supports a vertical truss member V8 and vehicle spring supports and plate 146.

Trailer-Load Ramp

Trailer Z is provided at the rear with supports for the loading ramps or skids 150 and 152 which are connected to runways R5. Skids 150 and 152 are connected by pins 154 or similar devices. Bracket members 156 which serve to support pivots of runways R9 also support pivoted telescoping braces or struts 158. A loading jack 157 is secured to each bracket 156 for the purpose of supporting the load without undue structural stresses during loading operation. The telescoping struts 158 are capable of various adjustments through the use of pins 160 which are inserted into various holes of the telescoping struts 158 not shown. The end of the struts 158 are pivoted at 162 on brackets 156 and are connected to loading ramps 150 by pins 164 and 166. The pins 164 and 166 are removable to permit removal of loading ramps 150 which are coupled to runways R5 by means of pins 168. The braces 158 are swung towards the front of the trailer and engage the end of runways R5 and are coupled thereto by means of pins 166 and 168. The loading ramps 150 and 152 are stored within the trailer in the storage area previously mentioned. A support chain 170 is provided on either side of the trailer to support braces 158 during loading operations. The support chain 170 is connected from braces 158 to braces 172.

FIGURES 14, 15 and 16 show a Canton Binder type of hold-down which is particularly adaptable for this invention. The runway as illustrated in FIGURE 16 is provided with traction holes 180 and 182 in the bottom and the side respectively for receiving a tiedown bracket 184. The tiedown bracket 184 has a finger or pin 186 which projects through one of the holes and locks beneath the same. Where the tiedown is being used in the side wall of the runway, a reinforcing plate 188 is provided to prevent the finger 186 from cutting through the runway sheet metal. The bracket 184 has a shoulder member 190 which engages the top surface of the runway to provide locking action in the direction of tension. An eyelet 192 receives a tiedown ring 194 on the tiedown straps 196.

FIGURE 9 shows removable runways R3 pivotally connected to runways R2 by means of pivots 200. Runways R3 may be removed from pivotal connection at 200 with runways R2 and coupled to removable runways 204 which are connected to the trailer Z by pins at 206 for example, or by some other bracket supporting means. The dotted line position shown in FIGURE 9 illustrates the position the runways R3, and 204 and extensions 202 will be located for carrying 7 compact automobiles.

Runways R4 are provided with removable jump skids 208. The jump skids 208 may be stored in the trailer in the container provided.

Pivoted runways R4 are provided with a sliding extension 210 similar to the sliding extension 36 on runway 14 of the headramp Y. Runways R2 have removable sections 212. Sections 212 may be removed through suitable pins 214. The removal of the various sections of runway R2 and the utilization of runways R3 in the manner just described permits flexibility in adapting trailer Z to numerous types of vehicles.

The trailer is provided with a stationary connecting piece 216 as shown in FIGURE 4 which overlays and joins cross members 114 and 116 to form a stationary cross support. The bottom platform of the trailer is provided with stationary runways 218 as best illustrated in FIGURE 5.

The pivots for runways R1 and R2 are located on cross member 112. The pivots for runways R3 are located on runways R2 at pivot 200. The pivots for runways R4 are located on cross member 114. The pivots for runways R5 are located on cross member 116. The pivots 220 for runways R6 are located on the stationary runway section 72 adjacent the wheel pocket. The pivots 222 for runways R7 are located on cross member 106. Runways R8 are pivoted about pivot pins 226. The pivot pins 226 for runways R8 are located at the end of runways R9. The pivots for runways R9 are located at the brackets 156 and the cross member 228.

Chains C1 and C2

It will be obvious that chain C1 operated through piston P5 may be used to raise and lower runways R7 and R8 depending upon the runways to be raised. Removable pins may be used to maintain the runways in elevated position which pins can be inserted into the guide rails G4 and G5 respectively. Runway R9 is elevated by use of the chain C2 operating through hydraulic piston P6. Elevation may be maintained by the use of pins in the guide rails G7 in the same manner as in guide rails G4 and G5.

General

It is contemplated that dual axles should be used at the rear of the trailer with two tires on each axle to give a better load distribution. It is further contemplated that the wheel-fellies be reversed from the usual order, in order to provide a minimum width to the vehicle with the dual tires as near to the ends of the axle as possible. The axle will have to be specially constructed in order to accommodate this feature.

It is further contemplated that four springs will be mounted on the underside of the two rear axles close to the tires to give the load a better balance as far as side sway is concerned. This also allows the use of smaller wheels bringing the load closer to the runway and giving better road stability.

The front loading of the trailer will be necessary where a large truck with extra wide width must be loaded. Generally, smaller trucks and automobiles may be loaded from the front head-ramp or from the rear of the trailer as in normal operation. It is also contemplated that the runways R3 with extensions 202 and 204 be capable of accommodating two small compact automobiles. Larger automobiles may be accommodated if the length of the trailer is increased from 5 to 10 feet. Variation in length of the trailer will depend considerably upon the laws of the states in which it will be used. This is also true with respect to height.

While the invention has been described in connection with different embodiments thereof, it will be understood that it is capable of further modification, and this application is intended to cover any variations, uses or adaptations of the invention following, in general, the principles of invention and including such departures from the present disclosure as come within known or customary practice in the art to which the invention pertains, and as may be applied to the essential features herein set forth and as fall within the scope of the invention or the limits of the depending claims.

Having thus described my invention what I claim is:

1. A wheeled tractor-trailer combination for hauling vehicles including duo rear wheels comprising a headramp for said tractor, said headramp including at least one pair of adjustable parallel, coextensive, pivoted runways, means on said tractor for raising and lowering said pivoted runways, said trailer including a plurality of pairs of pivotally opposed adjustable parallel, coextensive overhead platform runways and a plurality of pairs of pivoted adjustable parallel, coextensive base platform runways, said trailer having front and rear stationary overhead cross supports serving as fulcrums for said pivotally opposed overhead runways, said base platform runways passing between the rear wheels of said trailer and just above said wheel axles, said rear cross support being positioned on said trailer directly above and between the space occupied by said duo rear wheels to provide loading clearance, means on said trailer for raising and lowering said pivoted trailer runways, said headramp and said trailer having stationary pairs of parallel, coextensive runways cooperating with said pivoted headramp and trailer runways to permit loading, and unloading of different types and sizes of vehicles.

2. A wheeled tractor-trailer combination for hauling vehicles comprising a headramp for said tractor, said headramp including at least one pair of adjustable, parallel, coextensive, pivoted runways, means on said tractor for raising and lowering said runways, a pair of fixed tracks mounted on said headramp, said pair of pivoted runways movable in said tracks, said tracks maintaining true relationship between said runways in all positions of adjustment, said trailer including a plurality of pairs of pivoted, adjustable, parallel, coextensive ovehead platform runways and base platform runways, said trailer having front and rear stationary overhead cross supports serving as fulcrums for said pivoted overhead runways, said base platform runways passing between the rear wheels of said trailer just above said wheel axles, said rear cross support being positioned on said trailer directly above the space occupied by said rear wheels, means on said trailer for raising and lowering said runways, a plurality of pairs of fixed base and overhead platform tracks, said base and overhead platform pairs of runways movable in said tracks, a pair of said overhead platform tracks being mounted in opposed relationship on either side of said stationary overhead cross supports, said overhead runways movable in said opposed overhead platform tracks, and said headramp and said trailer having fixed pairs of parallel, coextensive, runways cooperating with said pivoted runways, all of said runways cooperating to permit loading, transporting, and unloading of different sizes and makes of vehicles.

3. A tractor-trailer combination as in claim 2 and including means for front loading said headramp, means for front loading said trailer, and means for rear loading said tractor-trailer combination.

4. A tractor-trailer combination as in claim 2, and including extension means for front loading said headramp, extension means for front loading said trailer, and extension means for rear loading said tractor-trailer combination, and means for storing said loading extension means in said tractor-trailer combination.

5. A tractor-trailer combination as in claim 2, and wherein said means for raising and lowering said runways is power operated, said power operated means for said trailer including chain lifts for raising and lowering at least one pair of trailer runways.

6. A tractor-trailer combination as in claim 2, and wherein said means for raising and lowering said runways is power operated, said headramp and said trailer having wheel pockets in at least one pair of said runways, laterally sliding runways normally covering said wheel pockets and exposing same when head clearance must be maintained at a minimum.

7. A tractor-trailer combination as in claim 2, and wherein said means for raising and lowering said runways is power operated, said trailer having a pair of spaced vertical tracks on each side thereof, a cross bar vertically slidable in each pair of tracks, said cross bars supporting a pair of removable runways at various elevations in said trailer depending on vehicle type and size.

8. A tractor-trailer combination for hauling vehicles comprising a headramp for said tractor, said headramp including a pair of adjustable, parallel, coextensive, pivoted runways, hydraulic means for raising and lowering said runways, a pair of fixed tracks mounted on said headramp, said runways movable in said fixed tracks for maintaining true relationship between said runways in all positions of adjustment, said trailer including nine pairs of pivoted, adjustable, parallel, coextensive, runways; at least six power operated means including chain lifts for raising and lowering said nine pairs of runways, stationary runways on said headramp and said trailer connecting said pivoted runways, jump skids connecting said stationary and pivoted runways, a loading frame on said headramp and said trailer, means for storing said jump skids, said headramp pivoted runways and at least one pair of trailer pivoted runways having slidable extensions for accommodating various lengths of vehicles, said headramp and said trailer having wheel pockets in some of said runways, laterally sliding runways normally covering said wheel pockets and exposing same when head clearance must be maintained at a minimum, said trailer having a pair of spaced vertical tracks on each side thereof, a cross bar vertically slidable in each pair of tracks, said cross bar adapted to support a pair of removable runways at various elevations in said trailer depending on vehicle type and size, said trailer including a plurality of pairs of fixed tracks, said trailer pivoted runways movable in said tracks for maintaining true relationship between said runways in all positions of adjustment.

9. A headramp for tractor-trailers comprising, a pair of pivoted, adjustable, parallel, coextensive runways, power means for raising and lowering said runways, a pair of fixed tracks, said runways movable in said tracks, said tracks maintaining true relationship between said runways in all positions of adjustment, a pair of stationary runways, said stationary runways including wheel pockets, laterally sliding runways normally covering said wheel pockets and exposing same when head clearance must be maintained at a minimum, a movable front loading frame, means for storing said frame in said headramp, ladder and catwalk means associated with said headramp, said runways having holes, means associated with said holes for tieing down vehicles mounted on said headramp, said pivoted runways having sliding extensions to permit storage of various types and lengths of vehicles.

10. A headramp for tractor-trailers comprising, a pair of pivoted, adjustable, parallel, coextensive runways, power means for raising and lowering said runways, a pair of stationary runways including wheel pockets, laterally sliding runways normally covering said wheel pockets and exposing the same when head clearance must be maintained at a minimum, a movable front loading frame, means for storing said frame in said headramp, and sliding extensions on said pivoted runways to permit storage of various types and lengths of vehicles.

11. A trailer for vehicle carrying tractor-trailers, including a truss construction front and rear, said trusses having cantilevered members, an overhead platform ramp and base platform ramp; each of said ramps having a plurality of pivoted pairs of coextensive, adjustable, parallel runways, said trailer having at least one pair of coextensive, parallel, stationary runways, said runways cooperating with each other to permit easy loading, unloading, and storage of vehicles, power operated means for raising and lowering said pivoted runways, fixed guide means for maintaining said pairs of runways true with respect to each other at all times, said trailer including wheel pockets in at least one pair of said runways, and a pair of laterally sliding runways normally covering said wheel pockets and centrally shifted when head clearance must be maintained at a minimum.

12. A trailer for vehicle carrying tractor-trailers, including a truss construction front and rear, said trusses having cantilevered members, an overhead platform ramp and base platform ramp; each of said ramps having a plurality of pivoted pairs of coextensive, adjustable parallel runways, said trailer having at least one pair of coextensive, parallel, stationary runways, said runways cooperating with each other to permit easy loading, unloading, and storage of vehicles, power operated means for raising and lowering said pivoted runways, fixed guide means for maintaining said pairs of runways true with respect to each other at all times, said trailer including wheel pockets in at least one pair of said runways, a pair of laterally sliding runways normally covering said wheel pockets and centrally shifted when head clearance must be maintained at a minimum, means for loading and unloading said vehicles including runways and a movable rear loading frame, and means for storing said loading and unloading runways and said frame in said trailer.

13. A wheeled trailer combination for hauling vehicles, said trailer including a plurality of pairs of pivoted, adjustable, parallel, coextensive overhead platform runways and base platform runways, said trailer having front and rear stationary overhead cross supports serving as fulcrums for said pivoted overhead runways, said base platform runways passing between the rear wheels of said trailer just above said wheel axles, said rear cross support being positioned on said trailer directly above the space occupied by said rear wheels, means on said trailer for raising and lowering said runways, a plurality of pairs of fixed base and overhead platform tracks, said base and overhead platform pairs of runways movable in said tracks, a pair of said overhead platform tracks being mounted in opposed relationship on either side of said stationary overhead cross supports, said overhead runways movable in said opposed overhead platform tracks, and said trailer having fixed pairs of parallel, coextensive, runways cooperating with said pivoted runways, all of said runways cooperating to permit loading, transporting, and unloading or different sizes and makes of vehicles.

References Cited in the file of this patent

UNITED STATES PATENTS

| | | |
|---|---|---|
| Re. 19,776 | Judd | Dec. 3, 1935 |
| 1,894,534 | Dolan | Jan. 17, 1933 |
| 2,451,284 | Garnett | Oct. 12, 1948 |
| 2,461,927 | Schaldach | Feb. 15, 1949 |
| 2,567,100 | Carey | Sept. 4, 1951 |
| 2,610,891 | Crockett | Sept. 16, 1952 |
| 2,684,264 | Demos | July 20, 1954 |
| 2,820,665 | Blunden | Jan. 21, 1958 |
| 2,908,527 | Risner | Oct. 13, 1959 |
| 2,993,725 | Van Keuren | July 25, 1961 |